Oct. 23, 1956  E. L. SCHEIDENHELM  2,767,538
LEVELING MECHANISM FOR RIGID FRAME DISK HARROWS
Filed April 9, 1951  3 Sheets-Sheet 1
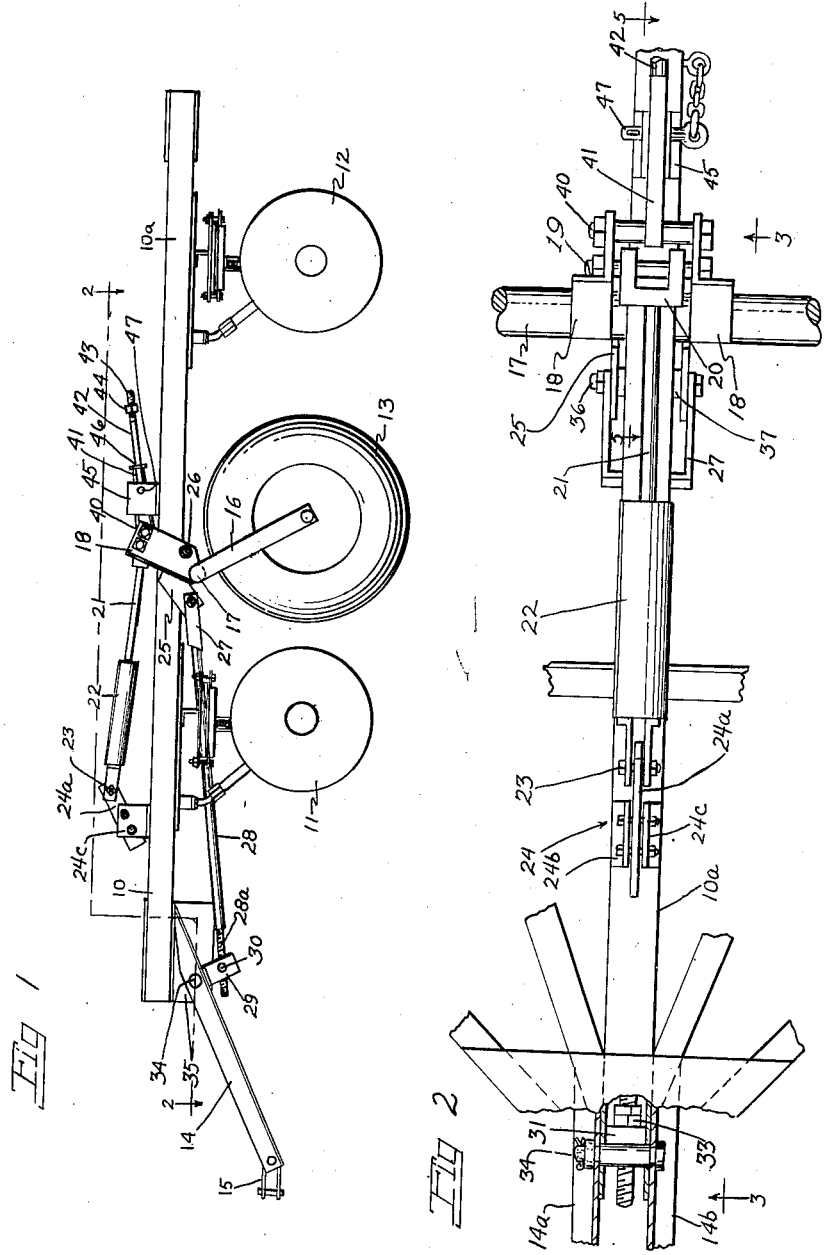
INVENTOR.
Earl L. Scheidenhelm
BY
Atty.

Oct. 23, 1956
E. L. SCHEIDENHELM
2,767,538
LEVELING MECHANISM FOR RIGID FRAME DISK HARROWS
Filed April 9, 1951
3 Sheets-Sheet 2
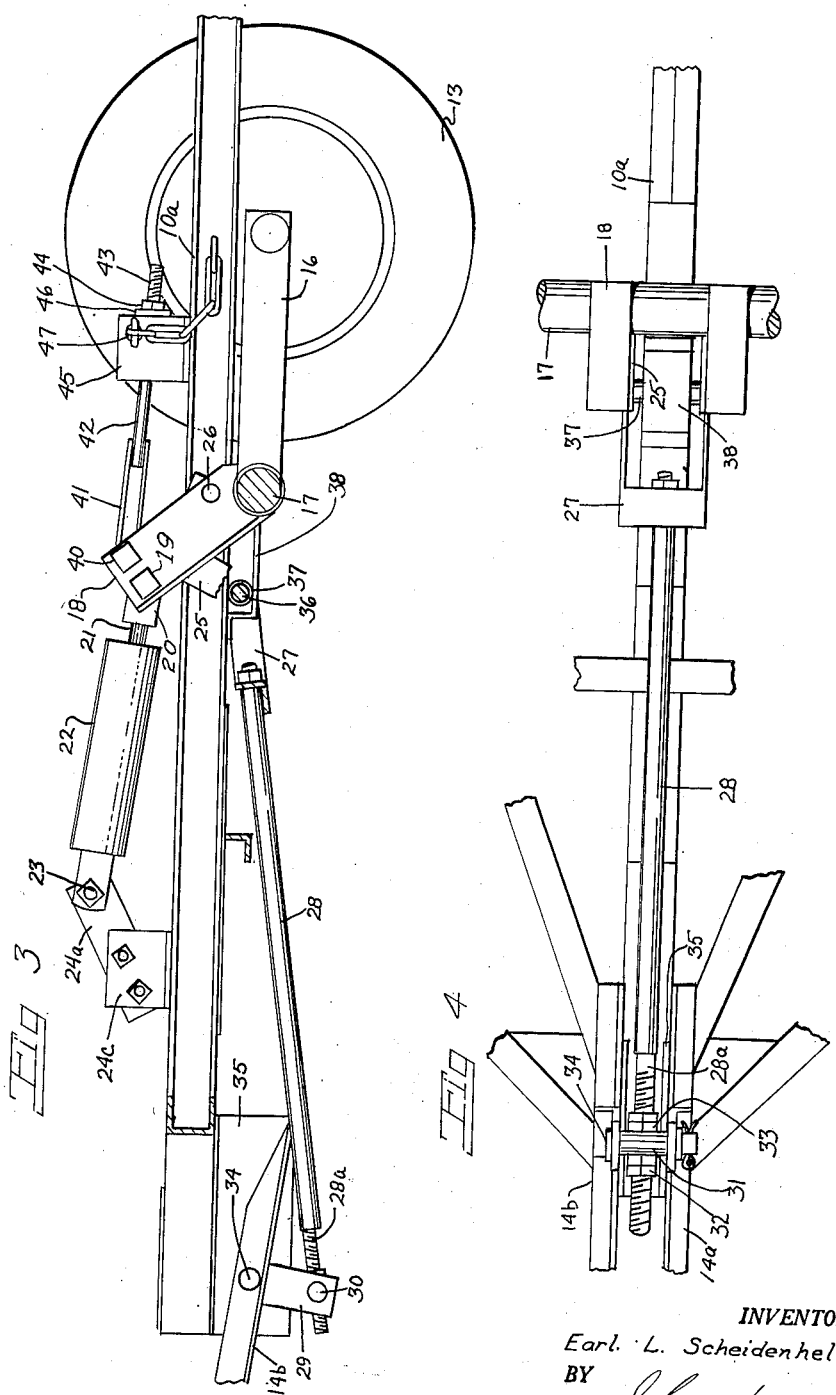
INVENTOR.
Earl L. Scheidenhelm

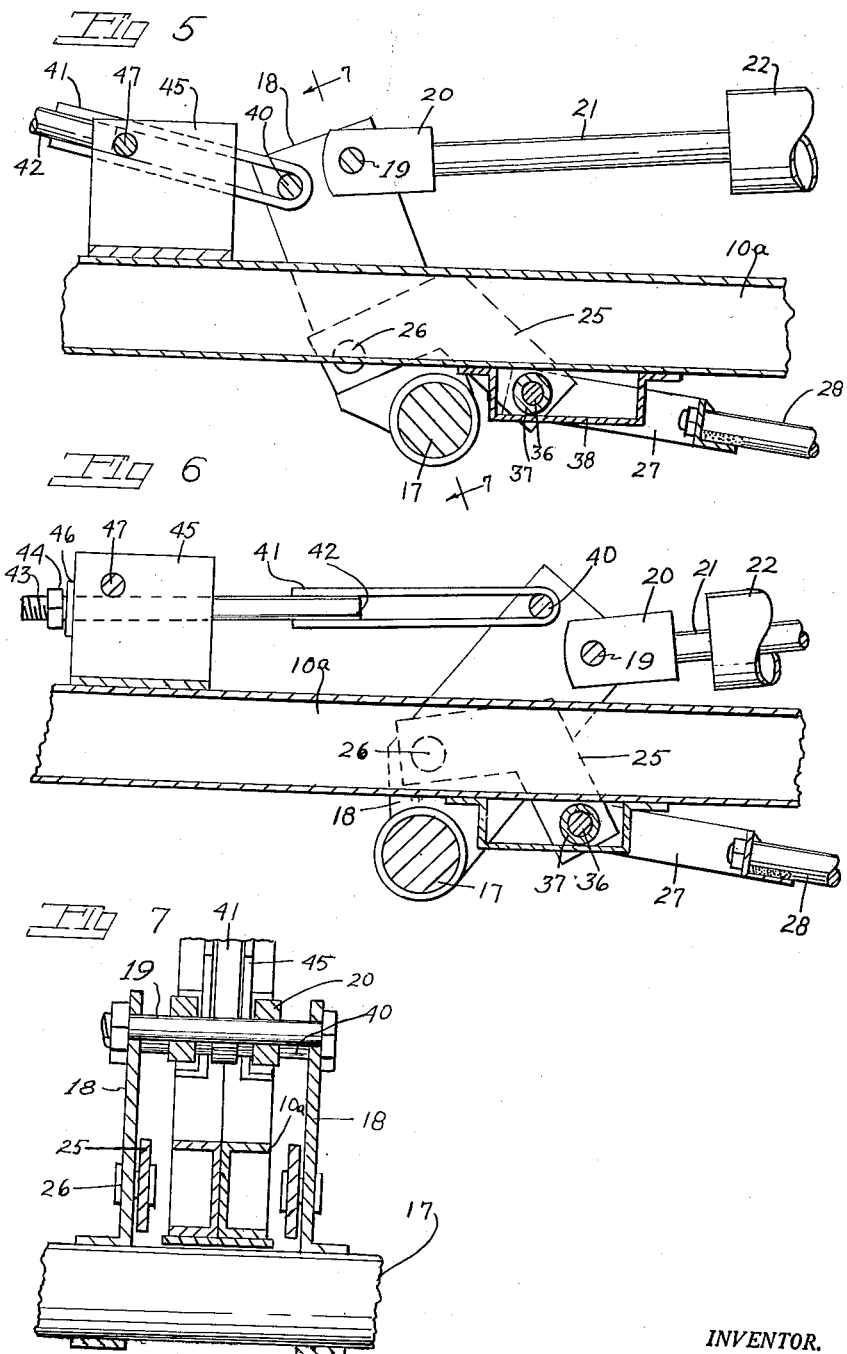

2,767,538

LEVELING MECHANISM FOR RIGID FRAME DISK HARROWS

Earl L. Scheidenhelm, Mendota, Ill., assignor to Horace D. Hume, Mendota, Ill.

Application April 9, 1951, Serial No. 219,998

2 Claims. (Cl. 55—73)

The present invention relates to improvements in a leveling mechanism for rigid frame disk harrows.

In the prior application of Fred A. Lampe and myself, Serial No. 182,188, filed August 30, 1950, and which issued September 13, 1955, as Patent No. 2,717,479, there is illustrated a rigid disk harrow frame to which the present invention applies. It is the principal purpose of the present invention to provide an improved leveling mechanism by which the tongue of the frame that is attached to the towing vehicle and the supporting wheels of the frame are controlled together so as to maintain the frame level, or at the desired angle to the horizontal, together with a depth control means operable to limit the lowering of the disks in both disking position and in carrying position.

The nature and advantages of my invention will appear from the following description and the accompanying drawings wherein a preferred form of the invention is illustrated. It should be understood however, that the drawings and description are illustrative only and are not intended to limit the invention except insofar as it is limited by the claims.

In the drawings:

Figure 1 is a view in side elevation of a disk harrow frame to which my invention is applied;

Figure 2 is an enlarged plan view of the leveling mechanism embodying my invention as it is applied to a disk harrow frame, the view being taken substantially on the line 2—2 of Figure 1;

Figure 3 is a sectional view taken on the line 3—3 of Figure 2;

Figure 4 is a bottom plan view looking upwardly at Figure 3;

Figure 5 is an enlarged sectional view taken on the line 5—5 of Figure 2;

Figure 6 is a view like Figure 5 but showing the parts in a changed position; and Figure 7 is a sectional view taken on the line 7—7 of Figure 5.

Referring now in detail to the drawings, my invention is utilized with a disk harrow frame of the type shown in the application hereinbefore mentioned. A rigid frame 10 supports disks gangs such as 11 and 12. The frame 10 is carried by wheels 13 and a tongue 14. The tongue 14 has a clevis 15 by which it is attached to the tow bar of a tractor or other towing vehicle. The wheels 13 have arms 16 that are fixed to an axle 17 which is pivotally mounted to the under surface of the frame 10. The particular mechanism by which the disk gangs 11 and 12 are secured to the frame 10 is not important to the present invention and therefore is not shown in detail.

The frame 10 embodies a central longitudinal member 10a which provides a convenient means for attaching the leveling mechanism of the present invention. The leveling mechanism includes upwardly extending lever arms 18 fixed on the axle 17. These lever arms 18 have a pin 19 near the top thereof to which a clevis 20 on the end of a piston rod 21 is secured. The rod 21 projects from an hydraulic cylinder 22 which is pivoted at 23 on a mounting bracket 24. The bracket 24 comprises a plate 24a which is bolted to a pair of flanges 24b and 24c that are welded to the member 10a. The upright lever arms 18 function essentially as a single arm and will be so referred to hereafter. Two L-shaped links 25 are pivoted to the lever arm 18 by a pivot member 26. These links 25 are coupled to a clevis 27 on one end of a link 28 that extends forwardly beneath the member 10a for connection to the tongue 14. The L-shaped links 25 pass around the axle 17 so as to clear this axle in all operating positions of the lever arm 18. The tongue 14 has depending arms 29 thereon which pivotally mount the ends 30 of a block 31 to which the link 28 is attached. The link 28 has a threaded front end portion 28a that extends through the block 31. Adjusting nuts 32 and 33 on opposite sides of the block 31 provide means for lengthening or shortening the distance between the block 31 and the clevis 27 which connects to the links 25.

The tongue 14 is pivoted to the frame 10 at the point of connection of the arms 29 by a pivot member 34 that passes through the tongue 14 and through depending plates 35 that are provided on the frame 10. The tongue 14 preferably is made up of two spaced apart members 14a and 14b which are extended rearwardly from the pivot 34 so they will engage the under surface of the frame 10 to limit the downward movement of the front end of the tongue.

The connection between the clevis 27 and the links 25 comprise a pin 36 which has a roller 37 thereon. The frame member 10a has a loop strap 38 secured to the under surface thereof to guide the roller 37 along a horizontal path as the link 28 moves endwise to change the angle of the tongue 14 with respect to the frame 10. It is evident that angular movement of the lever arm 18 will cause the links 25 to move the link 28 in the proper direction to lower the tongue 14 as the wheels 13 are lowered by the lever arm 18. The adjustment provided by the threaded portion 28a of the link 28, the block 31 and the nuts 32 and 33 is used to adjust the tongue 14 for different draw bar levels. Once the clevis 15 is attached to the draw bar of a towing vehicle this adjustment mechanism is also used to establish the proper position of the frame 10 with respect to the horizontal. In some instances it is desirable to hold the front disks higher than the rear disks or vice versa. Disks of different diameters may be employed for the front and rear gangs 11 and 12 because of this adjustment.

The lever arms 18 also provide means for establishing a depth control stop mechanism which functions to limit the depth of cut in addition to the hydraulic cylinder control. This same mechanism also functions to lock the frame 10 in carrying position with respect to the wheels 13 and the tongue 14 when the machine is being transported on the road or stored for the winter. The depth control stop mechanism includes a mounting pin 40 at the end of the lever arms 18. A link 41 is formed by a U-shaped strap that extends around the pin 40 and has the ends thereof welded to a rod 42. The free end of the rod 42 is threaded at 43 to receive a nut 44 and a washer 46 which together provide an adjustable stop. On the frame member 10a, I provide two upstanding spaced apart guides 45 between which the rod 42 and the link 41 can pass. The guides 45 act as a stop in connection with the washer 46 and the nut 44 so as to limit the extent to which the lever arms 18 can move forward. This limits the lowering of the frame 10 with respect to the wheel arms and the tongue and controls the depth to which the disks can extend into the ground. When it is desired to lock the frame 10 in raised position, the lever arms 18 are moved rearwardly and a pin 47 is passed through the link 41 and through the guides 45 as illustrated in Figure 5 of the drawings. The normal disking position of the depth control mechanism is illustrated in Figure 6 of the drawings, where the pin 47 is inserted through the guides 45 above the rod 42 so as to prevent the rod from jumping out of the guides 45.

It is believed to be evident from the foregoing description that I have provided a simple and effective means for which a rigid disk harrow frame is kept in a level position and can be raised or lowered with limits by one hydraulic cylinder that is controlled from the hydraulic system of the towing vehicle. The L-shaped links 25 and the guide 38 translate the angular movement of the lever arms 18 into an endwise movement of the link 28 of the proper amount to produce sufficient angular movement of the tongue 14 for raising and lowering the front end of the frame 10 the same amount as the wheels raise and lower the rear end thereof. The hydraulic control mechanism does not have to carry the load of the frame in disking or in traveling. The parts 40—46 provide a positive mechanical means to hold the lever arms 18 at the desired positions.

Having thus described my invention, I claim:

1. In a disk harrow, a rigid frame having a central longitudinal beam member, a tongue pivot secured to the frame beneath the front end of said member, a tongue pivoted on and projecting forward from said pivot for attaching the frame to a draw bar of a towing vehicle, a transverse axle pivotally mounted on the under side of said frame, wheel arms extending rearwardly from the axle, wheels at the free ends of said arms, lever arms fixed to the axle on opposite sides of said member and extending upwardly through the frame, means on the frame secured to the upper ends of said lever arms for moving them rearwardly to force the wheels downward with respect to the frame, links pivoted to said lever arms and extending forwardly and downwardly through the frame, a pivot member extending transversely of the frame beneath the central beam member and connecting the forward ends of said links, a guide on the lower side of said beam member guiding the pivot member lengthwise of the beam member when the axle is turned by said lever arms, a link secured to said pivot member and extending forwardly of the frame to the tongue, the forward end of the link being pivoted to the tongue below the tongue pivot whereby rearward movement of the link swings the tongue downward.

2. In a leveling mechanism for rigid frames for disk harrows, a rigid disk supporting frame, a tongue, means on the under side of said frame pivotally mounting the tongue, arms depending from said tongue at its pivotal mounting to the frame, a transverse axle pivoted to the frame on the lower side thereof, wheel arms on said axle extending rearwardly, wheels at the free ends of said arms, lever arms fixed to the axle and projecting up through the frame, L-shaped links pivoted to the lever arms above the axle and extending forwardly and downwardly, a link pivoted to the lower ends of the arms depending from said tongue and extending rearwardly to said L-shaped links, a guide beneath the frame, a pin pivotally connecting the link to said L-shaped links and extending transversely through said guide and guiding the pivotal connection of said link and L-shaped links lengthwise of the frame when the lever arms are moved to turn the axle, a link secured to the lever arms and extending rearwardly over the frame, said last named link having an elongated slot at its lever arm end, a pin extending through the slot and secured to the lever arms, spaced apart upstanding guides on the frame rearwardly of the lever arms receiving the last named link between them, the last named link having an adjustable stop thereon rearwardly of the guides for engaging the guides to limit the forward movement of the lever arms, and a removable pin through said guides normally overlying said last named link but insertible through the elongated slot when the last named link and lever arms are in their rearmost position.

References Cited in the file of this patent

UNITED STATES PATENTS

| | | |
|---|---|---|
| 1,653,677 | Strandlund | Dec. 27, 1927 |
| 2,320,742 | Newkirk | June 1, 1943 |
| 2,349,257 | Evans et al. | May 23, 1944 |
| 2,458,091 | Moore | Jan. 4, 1949 |
| 2,580,100 | Johansen et al. | Dec. 25, 1951 |
| 2,608,145 | Knapp | Aug. 26, 1952 |
| 2,623,341 | Evans et al. | Dec. 30, 1952 |